United States Patent
Brunn et al.

(10) Patent No.: US 10,746,624 B2
(45) Date of Patent: Aug. 18, 2020

(54) DETERMINING THE ROOT MEAN SQUARE VALUE OF A MACHINE VIBRATION VARIABLE

(71) Applicant: Prüftechnik Dieter Busch AG, Ismaning (DE)

(72) Inventors: Dietrich Brunn, Unterföhring (DE); Jan Germer, Munich (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 333 days.

(21) Appl. No.: 15/973,106

(22) Filed: May 7, 2018

(65) Prior Publication Data

US 2018/0328807 A1 Nov. 15, 2018

(30) Foreign Application Priority Data

May 12, 2017 (DE) .......................... 10 2017 110 342

(51) Int. Cl.
*G01M 1/22* (2006.01)
*G01H 1/00* (2006.01)
(Continued)

(52) U.S. Cl.
CPC ................ *G01M 1/22* (2013.01); *G01H 1/00* (2013.01); *G01M 7/00* (2013.01); *G01M 13/00* (2013.01); *G01H 3/005* (2013.01)

(58) Field of Classification Search
CPC .......... G01M 1/22; G01M 7/00; G01M 13/00; G01H 1/00; G01H 3/005
See application file for complete search history.

(56) References Cited

U.S. PATENT DOCUMENTS

| 3,802,256 A | 4/1974 | Formwalt |
| 3,975,952 A | 8/1976 | Lacher, Jr. et al. |
| (Continued) | | |

FOREIGN PATENT DOCUMENTS

| DE | 2237321 A1 | 10/1973 |
| DE | 3707524 A1 | 10/1987 |
| (Continued) | | |

OTHER PUBLICATIONS

Agrez, Dusan: Improving phase estimation with leakage minimization, IEEE Transactions on Instrumentation and Measurement, 2005, 54 vol., No. 4, p. 1347-1353.

*Primary Examiner* — Raymond L Nimox
(74) *Attorney, Agent, or Firm* — Barlow, Josephs & Holmes, Ltd.

(57) ABSTRACT

The invention relates to a method for determining the root mean square value of a vibration variable that is measured on a machine. A test measurement is carried out in order to obtain a test signal of the vibration variable with a test signal length; the influence of shortening the signal length of the test signal on the associated root mean square value is estimated and the relative deviation of the root mean square value emerging for a shortened signal length from the root mean square value emerging for the full test signal length is estimated therefrom as a function of the signal length to obtain a root mean square value error function; and a measurement of the vibration variable is carried out for determining the root mean square value. The measurement duration of this measurement is selected on the basis of the root mean square value error function.

15 Claims, 4 Drawing Sheets

(51) Int. Cl.
*G01M 7/00* (2006.01)
*G01M 13/00* (2019.01)
*G01H 3/00* (2006.01)

(56) References Cited

U.S. PATENT DOCUMENTS

| | | | | |
|---|---|---|---|---|
| 4,654,808 | A | * | 3/1987 | Potter ............... G06F 17/10 702/111 |
| 5,006,994 | A | | 4/1991 | Andersson et al. |
| 5,663,894 | A | | 9/1997 | Seth et al. |
| 6,308,139 | B1 | | 10/2001 | Reck et al. |
| 6,751,564 | B2 | * | 6/2004 | Dunthorn ............ G01R 23/16 702/66 |
| 7,264,593 | B2 | * | 9/2007 | Wellnhofer ....... A61B 5/02156 60/488 |
| 2007/0185620 | A1 | * | 8/2007 | Van Baren ........... G01M 7/022 700/280 |
| 2009/0199655 | A1 | | 8/2009 | Budmiger |
| 2009/0324040 | A1 | * | 12/2009 | Lindop ............... G01S 7/52042 382/131 |
| 2014/0090472 | A1 | * | 4/2014 | Lysen ................. F03D 7/0296 73/587 |
| 2017/0150909 | A1 | * | 6/2017 | Dalhoff ............... A61B 5/6817 |

FOREIGN PATENT DOCUMENTS

| | | |
|---|---|---|
| DE | 9400950 U1 | 8/1995 |
| DE | 10131934 A1 | 1/2003 |
| DE | 10134013 A1 | 1/2003 |
| DE | 102005016574 B4 | 12/2015 |
| EP | 0339003 A1 | 10/1989 |
| EP | 2610604 A2 | 7/2013 |
| EP | 3088733 A1 | 11/2016 |
| JP | H10319085 A | 12/1998 |
| KR | 20160109159 A | 9/2016 |
| WO | 2004112411 A1 | 12/2004 |
| WO | 2011087440 A1 | 7/2011 |

* cited by examiner

DETERMINING THE ROOT MEAN SQUARE VALUE OF A MACHINE VIBRATION VARIABLE

BACKGROUND OF THE INVENTION

The invention relates to a method and an apparatus for determining the root mean square value of a vibration variable measured on a machine.

Root mean square values of vibration variables play an important role in the vibration-based state monitoring of machines, and so the reliable determination of root mean square values is an essential constituent part of such state monitoring (the root mean square (RMS) value of a signal, also referred to as effective value, is the square root of the mean power). In practice, the root mean square value of a vibration variable can be determined by virtue of measuring the vibration variable over a certain measurement duration and calculating the root mean square value yell from the measured signal, taking into account a generally unambiguously set transfer function (frequency response), according to $$y_{\text{eff}} = \sqrt{\frac{1}{\tau}\int_0^\tau |y(t)|^2 dt} = \sqrt{\frac{1}{\tau}\int_0^\tau |g(t)*x(t)|^2 dt}$$

where τ denotes the signal length, g(t) denotes the transfer function and x(t) denotes the measured signal.

While the transfer function is set, as a rule, in order to keep the root mean square values comparable with one another, there usually is no strict guideline for the measurement duration. A significant influence of the measurement duration on the obtained root mean square value can emerge, in particular, in the presence of beats, i.e. if the vibration signal contains at least two substantial frequencies lying close together. In such a case, the obtained root mean square value may oscillate as a function of the measurement duration, making a reliable ascertainment of the root mean square value difficult. In particular, a root mean square value that differs from measurement to measurement may emerge as a result thereof, even though there has been no change in the machine state. By way of example, beats occur in the case of two fans, pumps or motors that rotate approximately the same or in the case of the construction-related slip of asynchronous motors and cannot, as a matter of principle, be suppressed by band-pass filters.

DE 101 34 013 A1 relates to a method for monitoring vibrations of machines, wherein the time interval between two measurement processes is set on the basis of the result of a test measurement.

WO 2011/087440 A1 describes a vibration monitoring of machines, where test measurements under laboratory conditions are used to determine the values of amplitude peaks as exactly as possible.

SUMMARY OF THE INVENTION

It is an object of the present invention to develop a method and an apparatus for determining the root mean square value of a vibration variable measured on a machine, wherein a particularly reliable ascertainment of the root mean square value should be facilitated.

According to the invention, this object is achieved by a method and by a system of the present invention.

In the invention, a particularly reliable determination of the root mean square value is obtained by virtue of a test measurement initially being carried out in order to obtain a test signal of the vibration variable with a test signal length, wherein the influence of shortening the signal length of the test signal on the associated root mean square value is estimated and the relative deviation of the root mean square value emerging for a shortened signal length from the root mean square value emerging for the full test signal length is estimated therefrom as a function of the signal length in order to obtain a root mean square value error function; in the subsequent actual measurements of the vibration variable for the purposes of determining the root mean square value, it is then possible to choose the best-suited measurement duration on the basis of the root mean square value error function in each case.

According to an application example, a maximum tolerable error for the root mean square value can be predetermined here, wherein, then, the measurement duration is chosen as the measurement duration associated with this root mean square value error value according to the root mean square value error function.

According to another application example, a quality indicator corresponding to the root mean square value error value associated with the measurement duration can be ascertained from the root mean square value error function for each measurement duration, wherein then, for example, during the running measurement, the quality indicator is regularly updated and output in accordance with the measurement duration that has already elapsed up until that point such that the measurement can be completed after reaching a certain minimum value of the quality indicator, for example.

Typically, the test signal is squared and transformed into the frequency domain in order to obtain spectral components of the squared test signal, wherein the influence of the shortening of the signal length of the test signal on the spectral components is estimated in order to estimate the influence of the shortening of the signal length of the test signal on the relative error of the root mean square value. In the process, windowing of the test signal is preferably undertaken, with a weighted sum of spectral components being ascertained; here, the weighting depends on the signal length and may be implemented as a linear filter, for example.

Further preferred configurations are discussed in detail below.

BRIEF DESCRIPTION OF THE DRAWING FIGURES

Below, configurations of the invention are explained in more detail in an exemplary manner on the basis of the attached drawings. In the drawings.

DESCRIPTION OF THE INVENTION

Figure 1:
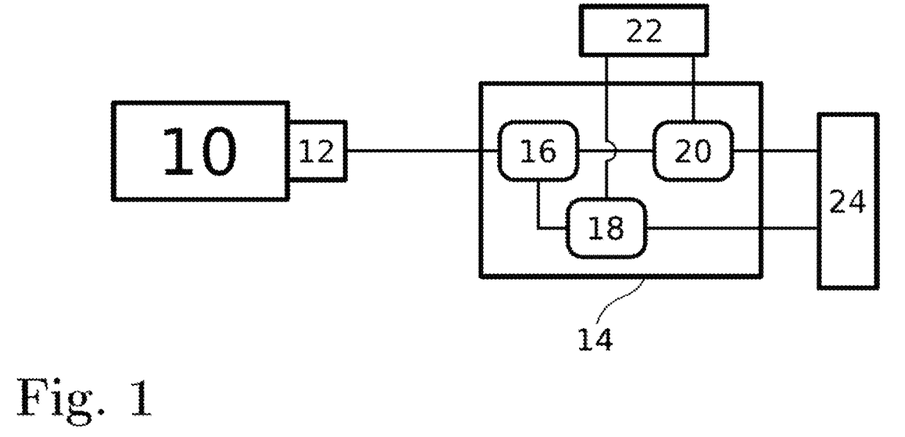
FIG. 1 shows a schematic illustration of an example of a system for ascertaining root mean square values on a machine.

FIG. 1 schematically shows an example for a system for determining root mean square values of machine vibration variables, wherein a machine 10 is provided with a vibration sensor 12, the latter measuring a vibration variable, for example speed or acceleration, at the machine over time. The sensor 12 is connected to an evaluation device 14 which ascertains root mean square values of the vibration variable from the signal of the sensor 12. The evaluation device 14 comprises a unit 16 for squaring the time signal of the sensor 12, a unit 18 for ascertaining a root mean square value error function by evaluating the complex spectrum of the squared vibration variable, which was obtained by transferring the squared signal into the frequency domain, and a unit 20 for ascertaining the root mean square value from the squared signal, taking into account the root mean square value error function determined by the unit 18. The system further comprises an input unit 22, by means of which, for example, measurements can be started and stopped and boundary conditions for the evaluation of the signals can be entered, and an output unit 24 for outputting results of the signal evaluation.

From a vibration measurement by means of the sensor 12, a bandwidth limited, temporally discrete signal with a certain length is obtained, said signal being sampled with a sampling frequency and a discrete spectrum being obtained therefrom by means of a Fast Fourier transform (FFT); here, this is a discretized version of the Fourier transform of the time signal x(t).

When determining the root mean square value of the signal x(t), a predetermined frequency response is usually realized by a filter with the demanded transfer function, the latter being applied to the signal x(t), as may be expressed by the convolution $$y(t)=g(t)*x(t).$$

As already mentioned at the outset, the root mean square value for a signal of length $\tau$ is given by:

$$y_{\mathit{eff}} = \sqrt{\frac{1}{\tau}\int_0^\tau |y(t)|^2 dt} = \sqrt{\frac{1}{\tau}\int_0^\tau |g(t)*x(t)|^2 dt}.$$

By way of the temporally discrete signal $y_k=y(kT)$, the effective value can also be determined by $$y_{\mathit{eff}} = \sqrt{\frac{1}{N}\sum_{k=0}^{N-1} |y_k|^2},$$

provided the sampling theorem is observed, where $N=\tau/T$ denotes the number of temporally discrete values and T denotes the sampling interval. Thus, the squared signal y(t) is evaluated when determining the root mean square value.

Figure 2:
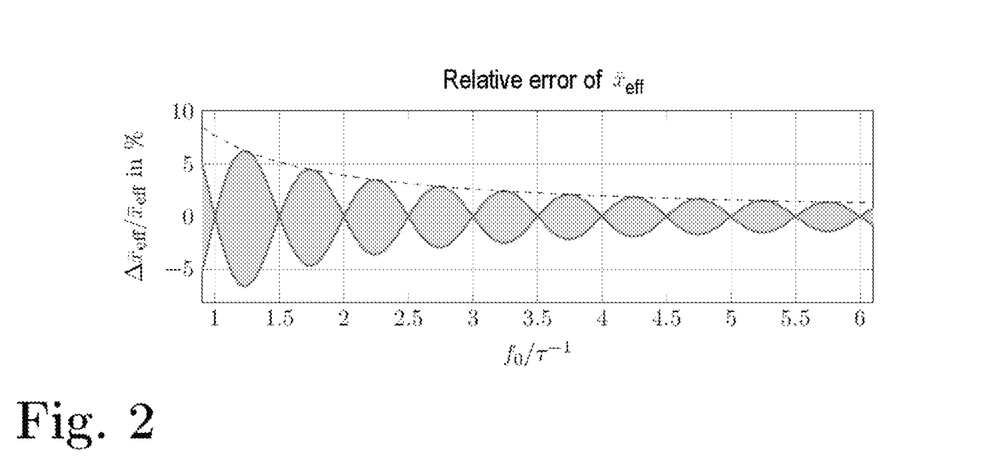
FIG. 2 shows an exemplary illustration of the relative error of the root mean square value of a sinusoidal signal as a multiple of the frequency resolution.

While the transfer function is unambiguously set, as a rule, when ascertaining the root mean square value, there generally is, however, no precise guideline for the measurement duration of the signal x(t), despite the result by all means depending on the measurement duration. FIG. 2 illustrates, in an exemplary manner, the influence of the measurement duration on the root mean square value for a signal which, to an approximation, only consists of a sinusoidal vibration, with the relative deviation of the emerging root mean square value (in percent) being specified as a function of the ratio of the frequency $f_0$ of the signal to the frequency resolution $\tau^{-1}$, i.e. as a function of the measurement duration or signal length $\tau$. By way of example, in the case of a signal length of five periods, the relative error of the root mean square value is approximately 2%. Since, as a rule, the frequency components of a vibration signal measured at the machine are not known, a multiple of the period of the high pass cut-off frequency of the band-pass filter required for the transfer function g(t) is often used as measurement duration in practice, since frequencies below this cut-off frequency do not provide any relevant contribution to the root mean square value.

Figure 3:
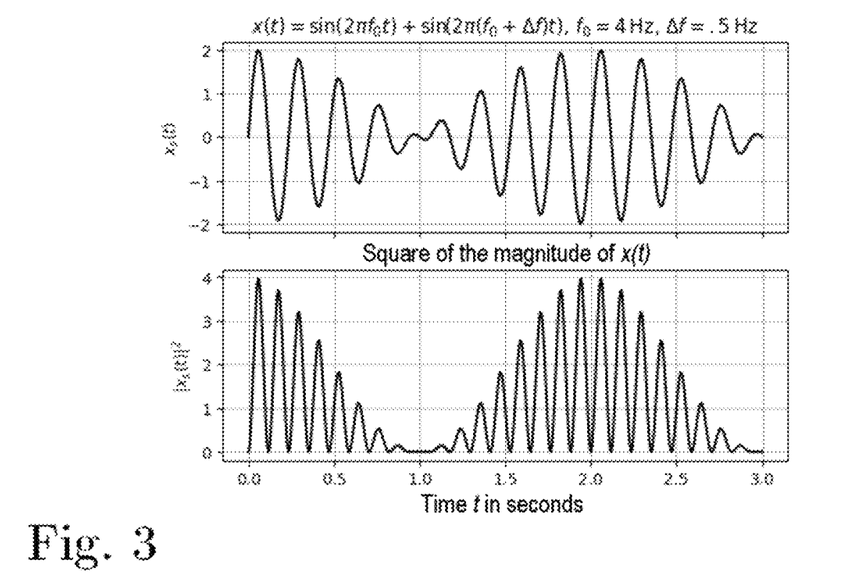
FIG. 3 shows an exemplary illustration of a measurement signal and of the square of the absolute value of the measurement signal that emerge from the superposition of two sinusoidal signals.

However, if beats are present, a measurement duration chosen in this way may turn out to be too short, as will be explained briefly using the following example. To this end, the sum of two sinusoidal vibrations with $f_0$=4 Hz and $f_1$=4 Hz+0.5 Hz is considered, with the signal $$\chi_s(t)=\sin(2\pi f_0 t)+\sin(2\pi (f_0+\Delta f)t) \qquad (1)$$

having a beat with a beat frequency of $\Delta f$=0.5 Hz. The time signal is shown at the top of FIG. 3. However, as mentioned above, the root mean square value is calculated from the squared signal (see FIG. 3, bottom). Even though the time signal does not have any frequency components that are less than 4 Hz, the lowest period duration of the squared signal is given by $\Delta f$=0.5 Hz. Accordingly, the measurement duration should therefore be a multiple of the period duration of this beat. It is clear from this example that the provision of set measurement times for ascertaining the root mean square value may be problematic since, as a rule, it is not possible to preclude beats.

Therefore, a test measurement is carried out prior to the actual measurement for ascertaining the root mean square value in the present invention. The test measurement is used to ascertain the uncertainty of the root mean square value determination as a function of the measurement duration for the specific measurement point such that the measurement duration can be fitted in an ideal manner to the signal. In the process, it is possible to ascertain a direct relationship between the uncertainty of the root mean square value and the measurement duration. According to one use example, the user may, in this case, prescribe a maximum tolerable uncertainty for the root mean square value, with the ideal measurement duration then being determined on the basis of the test measurements for each measurement point on the machine. Further, by way of the output device 24, for example in the form of a progress bar, it is possible to specify for the user during the actual root mean square value measurements the accuracy or measurement uncertainty of the root mean square value that has been achieved by the measurement duration up until that point as a quality indicator on the basis of the information items obtained by the test measurement; by way of example, this allows the user to make an informed decision as to whether it is expedient to complete the running measurement early in order to save time.

The starting point of a method for determining the root mean square value is a test measurement at the relevant measurement point, the measurement duration $\tau_0$ of said test measurement being sufficiently long to be able to resolve all relevant signal components, including beats. The test measurement duration or the test signal length depends on the lowest beat frequency $\Delta f_{min}$ that should be taken into account and said test measurement duration or test signal length should, in this case, be at least twice as long as the period duration of said lowest beat frequency.

Let $y_k$ be the temporally discrete, optionally filtered signal of length $N_0=\tau_0/T$, where T represents the sampling interval. The discrete Fourier transform $Y_l^{(2)}$ of the squared signal $y_k^2$ is determined from this signal, i.e.:

$$Y_l^{(2)} = \mathcal{F}\{y_k^2\}_l = \sum_{0}^{N_0} y_k^2 \cdot e^{2\pi \frac{kl}{N_0}}, l \in [-N_0/2, N_0/2] \subset \mathbb{Z}$$

Here, the value for $l=0$ corresponds to the power, $Y_0^{(2)}/N = y_{eff}^2$.

The influence of a measurement duration $\tau_1=N_1 T$ that is shorter than the test measurement duration $\tau_0$ on the emerging root mean square value is obtained by virtue of convolving the spectrum $Y^{(2)}$ with the Fourier transform $W_R(N_1)$ of a rectangle function $w_R(N_1)$ of length $N_1$:

$$Y^{(2)}(N_1) = Y^{(2)}(N_0) * W_R(N_1) \text{ where} \quad (2)$$

$$W_R(N_1) = \frac{1}{N_1} \sum_{k=0}^{N_1-1} e^{-i2\pi(k-k_1)Tf} = \frac{e^{-i(N_1-1)\pi Tf}}{N_1} \frac{\sin(N_1 \pi Tf)}{\sin(\pi Tf)}$$

The lines in the spectrum smear as a result of this convolution (so-called spectral leakage). Here, the contribution to $Y_0^{(2)}(N_1)$, which arises from smearing of the components $^{(2)}{}_{l \neq 0}(N_0)$, is relevant to the root mean square value. This contribution is obtained by virtue of evaluating the discrete convolution at $l=0$, i.e.

$$Y_{l=0}^{(2)}(N_1) = \sum_{k=-N_0/2}^{N_0/2} Y_k^{(2)}(N_0) \cdot W_{R,-k}(N_1) \quad (3)$$

The relative error $\Delta y_{eff}(\tau_1)$ arising from a short signal $t \leq \tau_1$ emerges as $$\Delta y_{eff}(\tau_1) = \frac{\sqrt{(Y_0^{(2)}(N_1))} - \sqrt{(Y_0^{(2)}(N_0))}}{\sqrt{(Y_0^{(2)}(N_0))}} \quad (4)$$

If a displaced time window of the same length, starting at to, were to be chosen, this is expressed in an additional phase factor in Equation (2), wherein, as a result of interferences in Equation (3), the value of $y_{eff}(\tau_1)$ changes depending on $t_0$ and, in the process, varies between $$\Delta y_{eff}(\tau_1) \in [\Delta_{eff,min}(\tau_1), \Delta y_{eff,max}(\tau_1)].$$

An upper bound for $y^{(2)}(N_1)$, and hence for $\Delta y_{eff}(\tau_1)$, is obtained by coherently summing all times in Equation (3):

$$Y_{l=0}^{(2)}(N_1) \leq \sum_{k=-N/2}^{N/2} |Y_k^{(2)}(N)| \cdot |W_{R,-k}(N_1)| \quad (5)$$

If the Fourier transform $W_R$ of the rectangular window is replaced by a suitable function W, the latter can be used to construct, for the root mean square value, an error estimate that monotonically decreases with increasing time window $\tau_1$ (or $N_1$); such a monotonic decrease is not present in the Fourier transform $W_R$ of a rectangular window since the latter oscillates. Using a window $W_{min}$ or a window $W_{max}$, it is possible to obtain a monotonically decreasing lower or upper estimate of the root mean square value emerging with the corresponding windowing:

$$Y_{max}^{(2)}(N_1) = \sum_{k=-N_0/2}^{N_0/2} |Y_k^{(2)}(N_0)| \cdot W_{max,k}(N_1), \quad (6)$$

$$Y_{min}^{(2)}(N_1) = \sum_{k=-N_0/2}^{N_0/2} |Y_k^{(2)}(N_0)| \cdot W_{min,k}(N_1)$$

An upper estimate is obtained by virtue of replacing the Fourier transform $W_R$ of the rectangular window by the envelope thereof, while a lower estimate (minimum error) is obtained by virtue of only using the principal maximum of $W_R$ around $f=0$ to the first root and setting all other values equal to 0:

$$W_{max}(N) = \begin{cases} \frac{1}{N} \frac{\sin(N\pi fT)}{\sin(\pi fT)} & \text{for } |f| \leq \frac{1}{2NT} \\ \frac{1}{N} \frac{1}{\sin(\pi fT)} \approx \frac{1}{N\pi fT} & \text{for } |f| > \frac{1}{2NT} \end{cases}, \quad (7)$$

$$W_{min}(N) = \begin{cases} \frac{1}{N} \frac{\sin(N\pi fT)}{\sin(\pi fT)} & \text{for } |f| \leq \frac{1}{NT} \\ 0 & \text{for } |f| > \frac{1}{NT} \end{cases}$$

Figure 4:
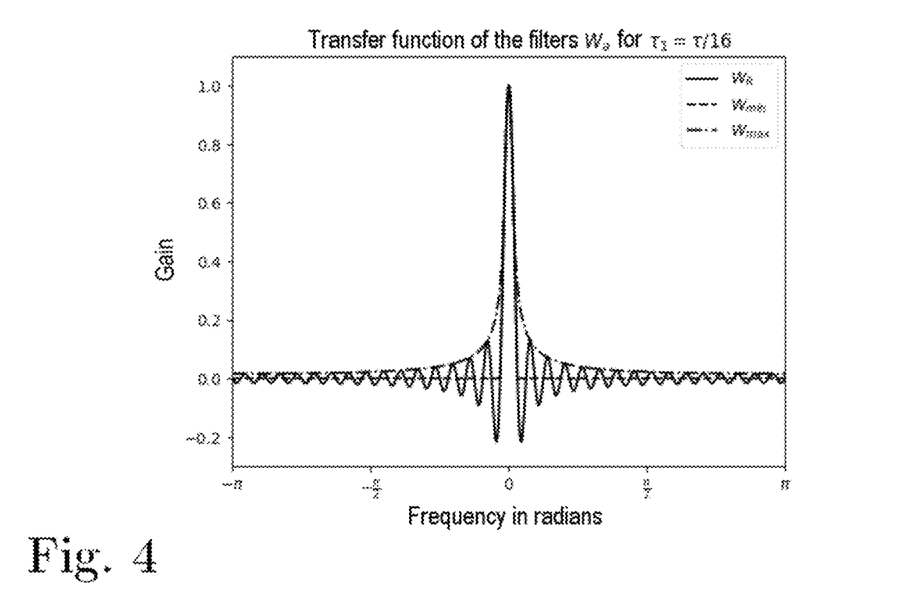
FIG. 4 shows examples for the transfer functions of different windows or filters, as may be used when ascertaining the dependence of the relative error of the root mean square value on the signal length.

Here, the windows W could be interpreted as low-pass filters that act on the signal $y^2$, with the corresponding filter characteristic (gain as a function of frequency), i.e. the transfer function of the specified filters, being presented in FIG. 4 in an exemplary manner. Here, it is clear that the rectangular window or the Fourier transform $W_R$ thereof, on account of its oscillating behaviour, is not suitable for estimating the error of the root mean square value, while the envelope $W_{max}$ and the first main oscillator $W_{min}$ exhibit the desired monotonic behaviour.

Figure 5:
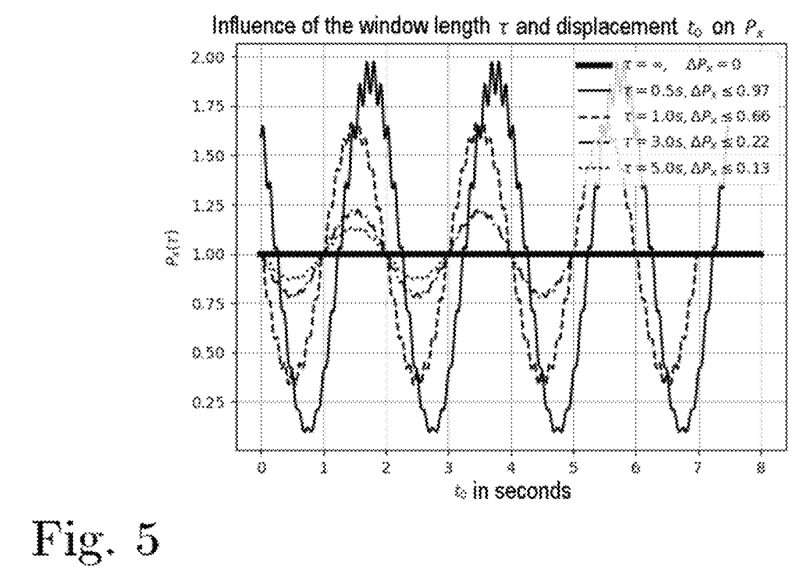
FIG. 5 shows examples for the variation of the relative error of the root mean square value for different window lengths as a function of the phase angle of the window.

FIG. 5 shows the relative deviation of the moving root mean square value for different window lengths $\tau$ for the exemplary signal of Equation (1) or FIG. 3, with it being clear that the root mean square value or the relative deviation of the root mean square value from the root mean square value in the case of an infinitely long measurement duration oscillates with the frequency of the beat.

Figure 6:
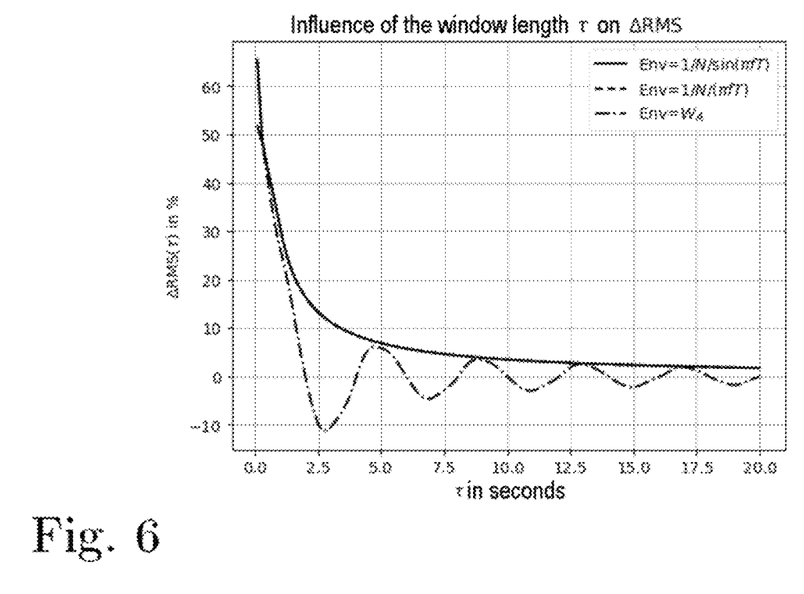
FIG. 6 shows examples for estimating the relative error of the root mean square value as a function of the window length or the signal length, wherein this is illustrated for a rectangular window and for an estimate of the minimum error and maximum error.

FIG. 6 shows an example for estimating the root mean square value error according to Equation (4) for the three filters of FIG. 4 (i.e., for the filters according to Equations (2) and (7)), with the relative error of the root mean square value being specified as a function of the window length or signal length $\tau$. By way of example, if the window or filter $W_{max}$ is chosen here, it is possible to specify the maximum relative error of the root mean square value (i.e., the deviation of the root mean square value, emerging from the finite signal length or measurement duration, from the true root mean square value emerging in the case of an infinitely long measurement duration) depending on the measurement duration or signal length; i.e., ultimately, a root mean square value error function is obtained, from which it is possible to read the minimum measurement duration or signal length that emerges for a set maximum tolerable root mean square value error.

By way of example, if the measurement duration emerging from a root mean square value error function based on $W_{max}$ turns out to be too long for certain machine types, it is possible, for example, to use a different filter, the latter being constructed in such a way that values between $Y_{max}^{(2)}$ and $Y_{min}^{(2)}$ are assumed. Here, it is possible, for example, to define the following set of filters for an a lying between 0 and 1:

$$W_a(N) = a \cdot W_{max}(N) + (1-a) \cdot W_{min}(N) \qquad (8)$$

which allows a continuous transition between minimum error value and maximum error value. This then allows a general estimate of the power $$Y_a^{(2)} = \sum_{k=-N_0/2}^{N_0/2} |Y_k^{(2)}(N_0)| \cdot W_a(N_1) = \sum_{k=-N_0/2}^{N_0/2} |\tilde{Y}_k^{(2)}(N_0)| \qquad (9)$$

In the process, the last magnitude term may, alternatively, also be obtained from a corresponding filtered signal, wherein the filter corresponds to the Fourier transform $w_a$ of the window $W_a$:

$$\tilde{y}_k^{(2)}(N) = y_k^2 * w_a(N)$$

Consequently, it is also possible to realize the coefficients by way of appropriate filter banks.

Figure 7:
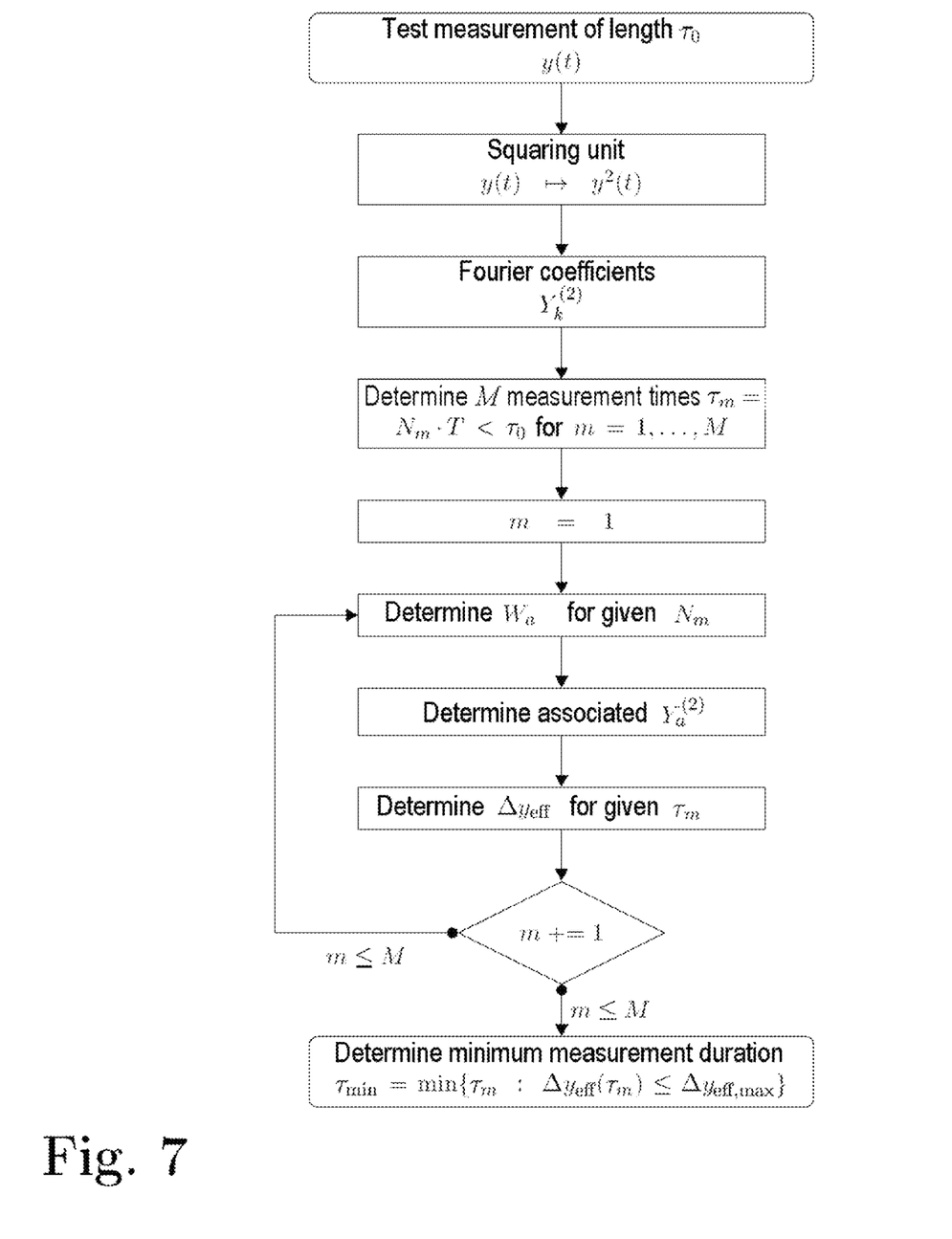
FIG. 7 shows a flowchart for ascertaining the minimum measurement duration depending on a predetermined maximum tolerable error.

FIG. 7 shows a flowchart of the described example of a method for determining a root mean square value. This example contains the following steps: Step 100: test measurement; Step 101: square the test signal; Step 102: carry out a Fourier transform of the squared test signal; Step 103: determine a set of M measurement durations m=1, . . . M; Step 104: set m=1; Step 105: determine a window $W_a$ for the measurement duration m; calculate the root mean square value for this window; Step 107: calculate the relative deviation of the root mean square value arising for this window or this measurement duration from the root mean square value emerging for the full test signal length; Step 108: go to the next measurement duration provided the last measurement duration has not yet been reached and repeat the estimate of the relative root mean square value error for the next measurement duration (i.e. return to Step 105); otherwise go to Step 109, in which the minimum measurement duration is determined in such a way that the emerging estimated relative root mean square value error lies below a set maximum error.

Since the function $Y_{max}^{(2)}(N_1)$ is monotonically decreasing, the corresponding relative error $\Delta y_{eff}(\tau_1)$ is also monotonically decreasing, and so a minimum measurement duration can be uniquely ascertained for a maximum error set in advance. By way of example, it may be set by the user. If a test measurement is carried out for each measurement point and the corresponding root mean square value error function is ascertained, the required minimum measurement duration then can be ascertained for each measurement point from the set maximum error. Preferably, a quality indicator is shown to the user at all times T during the actual root mean square value measurement, said quality indicator being based on the relative error $\Delta y_{eff}(\tau_1)$ that has already been achieved by the measurement at this point; by way of example, such a quality indicator could emerge from $1-\Delta y_{eff}(\tau_1)$.

It would be appreciated by those skilled in the art that various changes and modifications can be made to the illustrated embodiments without departing from the spirit of the present invention. All such modifications and changes are intended to be covered by the appended claims.

What is claimed is:

1. A method for determining the root mean square value of a vibration variable that is measured on a machine, wherein:
   measurement testing to obtain a test signal of the vibration variable with a test signal length;
   the influence of shortening the signal length of the test signal on the associated root mean square value is estimated and the relative deviation of the root mean square value emerging for a shortened signal length from the root mean square value emerging for the full test signal length is estimated therefrom as a function of the signal length in order to obtain a root mean square value error function; and
   measuring the vibration variable for determining the root mean square value, wherein the measurement duration of this measurement is selected on the basis of the root mean square value error function.

2. The method according to claim 1, wherein a maximum tolerable error for the root mean square value is predetermined and the measurement duration associated with this root mean square value error value according to the root mean square value error function is chosen as the measurement duration.

3. The method according to claim 1, wherein a quality indicator corresponding to the root mean square value error value associated with the measurement duration is ascertained for each measurement duration from the root mean square value error function.

4. The method according to claim 3, wherein, during the running measurement, the quality indicator is regularly updated and output in accordance with the measurement duration that has already elapsed up until that point such that the measurement can be completed after reaching a certain minimum value of the quality indicator.

5. The method according to claim 1, wherein the test signal is squared and transformed into the frequency domain in order to obtain spectral components of the squared test signal, wherein the influence of the shortening of the signal length of the test signal on the spectral components is estimated in order to estimate the influence of the shortening of the signal length of the test signal on the emerging root mean square value.

6. The method according to claim 5, wherein the influence of the shortening of the signal length of the test signal on the spectral components is estimated by windowing the test signal.

7. The method according to claim 6, wherein the influence of the shortening of the signal length of the test signal on the root mean square value is estimated by virtue of ascertaining a weighted sum of spectral components, with the weighting depending on the signal length.

8. The method according to claim 7, wherein the weighting emerges as envelope of the Fourier transform of a rectangular window, the length of which corresponds to the respective signal length, in order in each case to specify the maximum error for each signal length as the root mean square value error function.

9. The method according to claim 7, wherein the weighting emerges from the principal maximum of the Fourier transform of a rectangular window, the length of which corresponds to the respective signal length, at the frequency of zero to the first root, in order in each case to specify the minimum error for each signal length as the root mean square value error function.

10. The method according to claim 7, wherein the weighting emerges as a linear combination of a weighting specifying the minimum error for each signal length and a weighting specifying the maximum error for each signal length.

11. The method according to claim 7, wherein the weighting is implemented as a linear filter.

12. The method according to claim 1, wherein the root mean square value error function in each case specifies the maximum error for each signal length.

13. The method according to claim 1, wherein the root mean square value error function in each case specifies the minimum error for each signal length.

14. The method according to claim 1, wherein a dedicated root mean square value error function is determined for each measurement point on the machine by means of a dedicated test measurement.

15. A system for determining the root mean square value of a vibration variable to be measured on a machine, comprising:

a sensor for measuring the vibration variable on the machine over time;

an evaluation device, configured and arranged to
 to carry out a test measurement by the sensor to obtain a test signal of the vibration variable with a test signal length; and
 to estimate the influence of the shortening of the signal length of the test signal on the associated root mean square value and to estimate the relative deviation of the root mean square value emerging for a shortened signal length from the root mean square value emerging for the full test signal length therefrom as a function of the signal length in order to obtain a root mean square value error function; and an output device, configured and arranged either
 to output a minimum measurement duration for a measurement of the vibration variable for determining the root mean square value for a predetermined maximum tolerable error for the root mean square value on the basis of the root mean square value error function; or
 to output a quality indicator for the root mean square value during a running measurement of the vibration variable for determining the root mean square value at regular intervals according to the measurement duration that has already elapsed up until that point such that the measurement can be completed after reaching a certain minimum value of the quality indicator, wherein the quality indicator is ascertained from the root mean square value error function, in a manner corresponding to the root mean square value error value associated with the measurement duration.

* * * * *